United States Patent [19]

Terada et al.

[11] Patent Number: 5,319,441
[45] Date of Patent: Jun. 7, 1994

[54] METHOD AND APPARATUS FOR DETECTING WAVELENGTH OF LASER BEAM

[75] Inventors: Mitsugu Terada; Ken Ohmata; Michito Uehara; Hideaki Shibata; Yasuo Oeda; Yuichiro Terashi, all of Sodegaura, Japan

[73] Assignee: Mitsui Petrochemical Industries, Ltd., Tokyo, Japan

[21] Appl. No.: 114,287

[22] Filed: Sep. 1, 1993

Related U.S. Application Data

[63] Continuation of Ser. No. 708,291, May 31, 1991, abandoned.

[30] Foreign Application Priority Data

Jun. 1, 1990 [JP] Japan ................................ 2-143449

[51] Int. Cl.$^5$ ............................................. G01B 9/02
[52] U.S. Cl. ........................................ 356/352; 356/346
[58] Field of Search ............................... 356/352, 346

[56] References Cited

U.S. PATENT DOCUMENTS 4,172,663  10/1979  Byer et al. ........................... 356/352

Primary Examiner—Samuel A. Turner
Assistant Examiner—LaCharles P. Keesee, II
Attorney, Agent, or Firm—Sherman and Shalloway

[57] ABSTRACT

A laser light, whose wavelength is to be measured, is introduced into an etalon, a concentric circular interference stripe derived from the etalon is irradiated onto a one-dimensional photodetector array and a diameter of the interference stripe is measured to measure the wavelength of the laser light. Alternatively, if a reference laser light of known wavelength is introduced into the etalon, as described above, a wavelength measurement of extremely high accuracy can be made without being affected by positional deviations of the optical system.

5 Claims, 3 Drawing Sheets

METHOD AND APPARATUS FOR DETECTING WAVELENGTH OF LASER BEAM

This application is a continuation-in-part of application Ser. No. 07/708,291, filed May 31, 1991, now abandoned.

BACKGROUND OF THE INVENTION

The present invention relates to a method and apparatus for detecting a wavelength of a laser beam, and particularly, to apparatus of the type which uses etalon.

With recent trend of high density of LSI, attention has been paid to a lithography in which an excimer laser is formed into narrow band to form a wiring pattern. However, the excimer laser has a problem in that the wavelength stability is poor in terms of construction thereof. Therefore, it is necessary to stabilize the wavelength. As a general apparatus for stabilizing a wavelength, there is a method for measuring the wavelength of oscillation light, and applying feedback control to a laser oscillator in response to the measured result.

Since the wavelength of laser is delicately varied due to external turbulances such as using environment, mechanical vibrations and the like, it is a key how the wavelength is measured with high precision for stabilization of the oscillation wavelength. There are various methods for measuring the laser wavelength. A method which is relatively simple and can obtain a precision is one which uses an etalon. In this method, a laser beam is incident upon etalon, and a half portion of an interference stripe 20 depicted by the permeated light is irradiated on one dimensional photodetector array 21 as shown in FIG. 5. The one dimensional photodetector array comprises a number of light receiving elements such as CCDs arranged and outputs light and shade of the interference stripe 20 as the intensity of signal. Various processes are applied on the basis of addresses applied to these light receiving elements to obtain the wavelength.

The etalon varies in refractive index according to variations in temperature and humidity. Therefore, there is a method for correcting an error using a reference laser oscillation light having a reference wavelength. This method comprises introducing a reference laser oscillation light and a measured-laser oscillation light into an etalon, and measuring a positional difference between a concentric interference stripe caused by the reference laser oscillation light and a concentric interference stripe caused by the measured laser oscillation light to thereby measure the wavelength of the measured-laser oscillation light. In this case, the reference laser oscillation light and the measured-laser oscillation light are simultaneously or individually incident upon and measured.

However, in the aforementioned conventional methods, the position for measuring the interference stripe becomes deviated unless the relative positional relationship between the interference stripe made by the etalon and the one dimensional photodetector array is always constant. However, it is not easy to always keep such a relative positional relationship constant. Actually, there is a problem in that an error caused by the deviation of position is large.

For example, in the case where not only a simple error in adjustment of position but also a thermal expansion or mechanical vibration is applied to the apparatus, a positional error between the interference stripe and the one dimensional photodetector array occurs so that the interference stripe is irradiated on the portion different from a normal position, as a consequence of which a deviation occurs in the addresses of the light receiving elements.

SUMMARY OF THE INVENTION

The technical task of the present invention is to provide a method and apparatus for detecting a wavelength of a laser beam, which can accurately measure the wavelength even if some error occurs in the positional relationship between the interference strip and one dimensional photodetector array and the optical system.

The present invention employs the following method in order to solve the aforesaid technical task. That is, a measured laser oscillation light is introduced into an etalon 1. A concentric circular interference stripe from the etalon 1 is irradiated on one dimensional detector array 2. A diameter of the interference stripe is measured to measure the wavelength. Since the relationship between the wavelength of incident light and the diameter of the interference strip is 1:1, the wavelength can be obtained by computation from the diameter of the interference stripe.

The measured laser oscillation light and a reference laser oscillation light are introduced into an etalon, concentric circular interference stripes caused by each laser oscillation light from the etalon are irradiated on one dimensional photodetector array, a length of a diameter or chord of the concentric circular interference stripe caused by the reference laser oscillation light and a length of a diameter or chord of the concentric circular interference stripe caused by the measured laser oscillation light are measured, and the ratio between a length of a diameter or chord of the concentric circular interference stripe caused by the reference laser oscillation light and a length of a diameter or chord of the concentric circular interference stripe caused by the measured laser oscillation light is multiplied by the wavelength of the reference laser oscillation light to measure the wavelength of the measured laser oscillation light.

In the case where the reference laser oscillation light and the measured laser oscillation light are introduced into the etalon, they may be simultaneously entered to obtain data of the diameter simultaneously or may be individually entered to obtain data of the diameter individually.

The apparatus for detecting a wavelength of a laser beam according to the present invention comprises an etalon for receiving and introducing measured laser oscillation light, one dimensional photodetector array arranged on the side in which laser oscillation light is emitted from the etalon, and a position measuring means for measuring a position of a concentric circular interference stripe irradiated on the one dimensional detector array, said one dimensional photodetector array being arranged at a position including a diameter portion of the concentric circular interference stripe derived from the etalon.

The present invention further provides an apparatus for detecting a wavelength of a laser beam comprising a reference laser device for emitting a reference laser oscillation light, an etalon for receiving and introducing a reference laser oscillation light and a measured laser oscillation light, one dimensional photodetector array arranged on the side in which each laser oscillation light derived from the etalon, and a position measuring means for measuring a position of each concentric circular interference stripe irradiated on said one dimensional photodetector array, said one dimensional photodetector array being arranged at a position including a diameter portion of the concentric circular interference stripe derived from the etalon, said measuring means measuring a first position (which shows a length of a diameter or chord of the interference stripe) of the concentric circular interference stripe caused by the reference oscillation light irradiated on said one dimensional photodetector array and measuring a second position (which shows a length of a diameter or chord of the interference stripe) of the concentric circular interference stripe caused by the measured laser oscillation light, positioned on a line connecting said measured first positions.

In the present invention, the wavelength is obtained by computation from the obtained diameters, the ratio of the diameters and the ratio of the lengths of the chords. This computation may be manually accomplished or may be automatically accomplished by the arithmetic means.

The one dimensional photodetector array used may be of either static type or dynamic type.

These methods and apparatuses can be applied to not only excimer laser but all laser apparatuses.

Since the diameter of the concentric circular interference stripe is measured by the one dimensional photodetector array, even if the relative position between the concentric circular interference stripe and one dimensional photodetector array is deviated but the diameter itself of the concentric circular interference stripe is not varied, and therefore, the diameter of the concentric circular interference stripe irradiated on the one dimensional photodetector array can be accurately detected.

In the case where the reference laser oscillation light is used, the precision can be further improved.

That is, two concentric circular interference stripes caused by the reference laser oscillation light and the measured laser oscillation light are obtained from the etalon, and the interference stripes are mutually displaced in the same way with respect to both the deviation of the optical system and the change in state of the using environment. In the case where a deviation occurs in the optical system, each interference stripe measured by one dimensional photodetector array is the chord of that. Since the interference stripes are circular in shape, the diameter is proportional to the length of the chord. Accordingly, if the ratio of dimensions of two concentric circular interference stripes caused by the reference laser oscillation light and the measured laser oscillation light is used as data of wavelength, accurate measurement can be made irrespective of the positional deviation of the optical system. On the other hand, two concentric circular interference stripes are affected at the same rate by the variation of the refractive index caused by the variation of the using environment, and therefore, errors therebetween are offset and can be easily corrected.

According to the present invention, since the diameter of the concentric circular interference stripe is to be measured, accurate measurement can be made without being affected by the positional deviation of the optical system.

Moreover, if the reference laser oscillation light and the measured laser oscillation light are to be introduced into the etalon, extremely high accurate wavelength measurement can be made without being affected by the positional deviation of the optical system and the precision.

BRIEF DESCRIPTION OF THE DRAWINGS

FIGS. 1 to 4 show embodiments of the present invention. FIG. 1 is a side view of apparatus shown in a first embodiment;

FIG. 3 is a side view of apparatus shown in a second embodiment;

DESCRIPTION OF PREFERRED EMBODIMENTS OF THE INVENTION

First Embodiment

Figure 1:
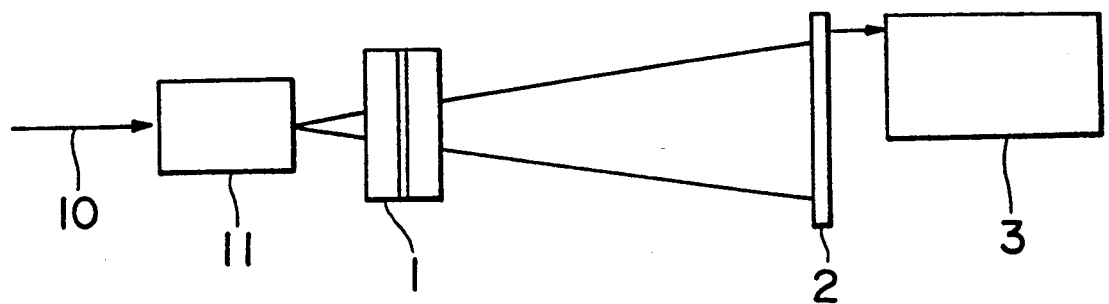
Figure 2A:
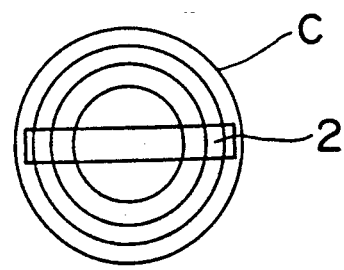
FIGS. 2(a) and 2(b) show the principle of operation of the apparatus, showing the relationship between the concentric circular interference stripe and output distribution of one dimensional photodetector array.
Figure 2B:
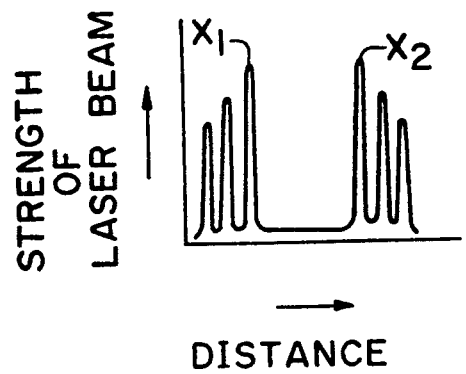

The first embodiment will be described with reference to FIGS. 1 and 2. Measured laser oscillation light 10 is diffused through a diffusion optical system 11 and incident upon an etalon 1. The light derived from the etalon 1 is in the form of a concentric circular interference stripe C, which is irradiated on one dimensional photodetector array 2 having the length at least substantially equal to the maximum diameter of the stripe C. The one dimensional photodetector array 2 is arranged at the diameter position of the concentric circular interference stripe C as much as possible. A measuring means 3 is connected to the one dimensional photodetector array 2. The measuring means 3 inputs illumination information of one dimensional photodetector 2, which information is processed by a computer. More specifically, as shown in FIG. 2(b), the maximum illumination points appearing at two points ($X_1$, $X_2$) of the one dimensional photodetector array 2 are measured, and the addresses thereof are subtracted to detect the diameter of the concentric circular interference stripe C.

Second Embodiment

Figure 3:
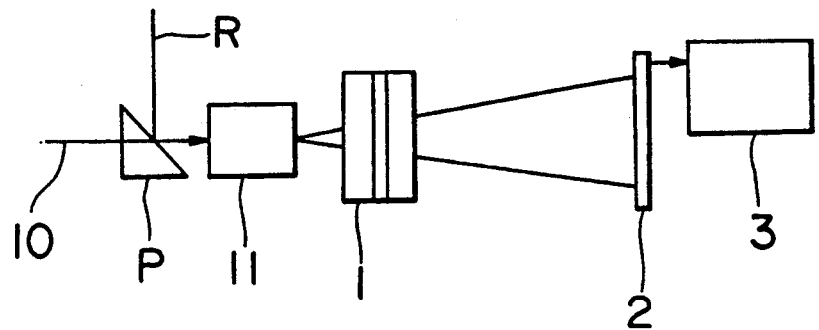
Figure 4A:
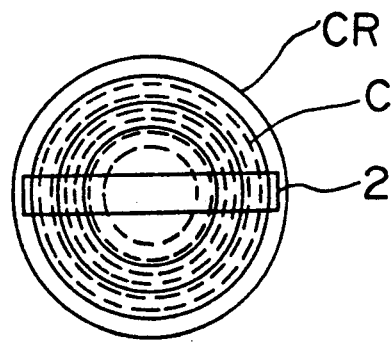
FIGS. 4(a) and 4(b) show the principle of operation of the apparatus, showing the relationship between the concentric circular interference stripe and output distribution of one dimensional photodetector array.
Figure 4B:
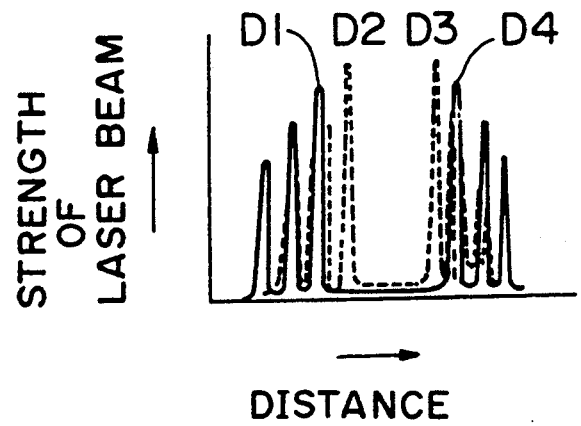
Figure 5A:
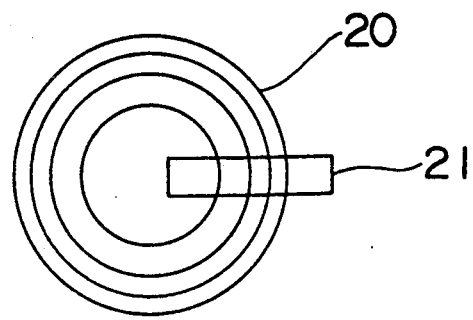
FIGS. 5(a) and (b) show the principle of a conventional method for detecting a wavelength of a laser beam, showing the relationship between the concentric circular interference stripe and output distribution of one dimensional photodetector array.
Figure 5B:
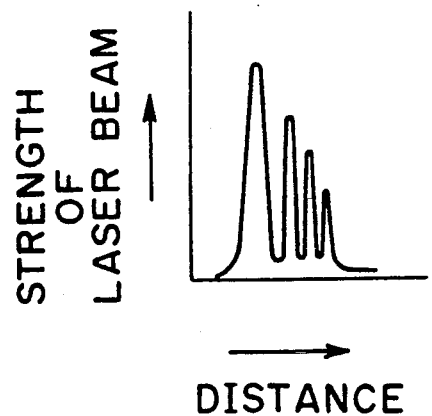

The second embodiment will be described with reference to FIGS. 3, 4(a) and 4(b). The same parts are those explained in the aforementioned first embodiment are indicated by the same reference numerals, and explanation thereof will be omitted.

In the front stage of the diffusion optical system 11 is arranged a prism P for coaxially introducing a reference laser oscillation light R and a measured laser oscillation light 10, each laser oscillation light being incident upon the etalon 1. Then, concentric circular interference stripes CR and C caused by the reference laser oscillation light R and the measured laser oscillation light 10, respectively, are obtained from the etalon 1 as shown in FIG. 4(a). The diameter between D2 and D3 (peak values), shown in FIG. 4(b), of the innermost peripheral stripes of the concentric circular interference stripe C and the diameter between D1 and D4 (peak values), also shown in FIG. 4(b), of the innermost peripheral stripes of the concentric circular interference stripe CR are obtained from the addresses of the one dimensional photodetector array 2.

(D3−D2)/(D4−D1) is calculated to obtain data of wavelength values.

Since the wavelength of the reference laser oscillation light R is known, this wavelength is multiplied by the aforesaid ratio to obtain the wavelength of the measured laser oscillation light 10. This calculation may be automatically accomplished by a microcomputer.

As described above, by the arrangement wherein the reference laser oscillation light and the measured laser oscillation light are introduced into the etalon, extremely high accurate wavelength measurement can be made without being affected by the positional deviation of the optical system and the precision. It is noted that laser oscillation light may be alternately incident upon without using the prism P.

What is claimed is:

1. A method for detecting a wavelength of a laser beam comprising
    simultaneously introducing a reference laser oscillation light and a measured laser oscillation light into an etalon,
    irradiating concentric circular interference stripes caused by said reference laser oscillation light and said measured laser oscillation light emanating from the etalon on a one dimensional photodetector array arranged at a position including a diameter portion of the concentric circular interference stripes,
    measuring a length of a diameter or chord of the concentric circular interference stripe caused by the reference laser oscillation light and a length of a diameter or chord of the concentric circular interference stripe caused by the measured laser oscillation light, and determining the ratio therebetween, and
    multiplying the wavelength of the reference laser oscillation light by said ratio to determine the wavelength of the measured laser oscillation light.

2. The method according to claim 1, wherein a length of a diameter or chord of the concentric circular interference stripe caused by the reference laser oscillation light and a length of a diameter or chord of the concentric circular interference stripe caused by the measured laser oscillation light are measured, and the ratio therebetween is multiplied by the wavelength of the reference laser oscillation light to automatically measure the wavelength of the measured laser oscillation light using arithmetic means.

3. An apparatus for detecting a wavelength of a measured laser beam consisting of
    an etalon, having an input side and an output side, for simultaneously receiving a reference laser oscillation light and a measured laser oscillation light on said input side and radiating concentric circular interference stripes caused by said reference laser oscillation light and said measured laser oscillation light from said output side,
    a one-dimensional photodetector array, arranged on said output side of said etalon, to receive radiation from said etalon, at a position including a diameter portion of said concentric circular interference stripes emanating from said etalon, and
    a position measuring means, operatively connected to said one-dimensional photodetector array, for simultaneously measuring a length of a diameter or a chord of a concentric circular interference strip caused by said reference laser oscillation light and a length of a diameter or a chord of a concentric circular interference strip caused by said measured laser oscillation light and determining the ratio therebetween.

4. The apparatus according to claim 3, wherein said one dimensional photodetector array is of a static type or a dynamic type.

5. An apparatus for detecting a wavelength of a measured laser beam consisting of
    an etalon, having an input side and an output side, for simultaneously receiving a reference laser oscillation light and a measured laser oscillation light on said input side and radiating concentric circular interference stripes caused by said reference laser oscillation light and said measured laser oscillation light from said output side,
    a reference laser device, optically connected to said etalon, for supplying a reference laser oscillation light of predetermined wavelength to said etalon when a measured laser oscillation light is supplied to said etalon,
    a one-dimensional photodetector array, arranged on said output side of said etalon, to receive radiation from said etalon, at a position including a diameter portion of said concentric circular interference stripes emanating from said etalon, and
    a position measuring means, operatively connected to said one-dimensional photodetector array, for simultaneously measuring a length of a diameter or a chord of a concentric circular interference stripe caused by said reference laser oscillation light and a length of a diameter or a chord of a concentric circular interference stripe caused by said measured laser oscillation light and determining the ratio therebetween.

* * * * *